(12) United States Patent
Chang et al.

(10) Patent No.: US 10,800,711 B2
(45) Date of Patent: Oct. 13, 2020

(54) CERAMIC AND PLASTIC COMPOSITE AND METHOD FOR FABRICATING THE SAME

(71) Applicants: COXON Precise Industrial Co., Ltd., Taoyuan (TW); Dong Guan Cheng Da Metal Product Co., Ltd., Dongguan, Guangdong Province (CN); Dong Guan Chensong Plastic Co., Ltd., Dongguan, Guangdong Province (CN); Sinxon Plastic (Dong Guan) Co., Ltd., Dongguan, Guangdong Province (CN)

(72) Inventors: Wen-Tung Chang, Taoyuan (TW); Jong-Yi Su, Taoyuan (TW)

(73) Assignees: COXON PRECISE INDUSTRIAL CO., LTD, Taoyuan (TW); SINXON PLASTIC (DONG GUAN) CO., LTD, Dongguan, Guangdong Province (CN); DONG GUAN CHENG DA METAL PRODUCT CO., LTD, Dongguan, Guangdong Province (CN); DONG GUAN CHENSONG PLASTIC CO., LTD, Dongguan, Guangdong Province (CN)

( * ) Notice: Subject to any disclaimer, the term of this patent is extended or adjusted under 35 U.S.C. 154(b) by 151 days.

(21) Appl. No.: 15/978,749

(22) Filed: May 14, 2018

(65) Prior Publication Data
US 2019/0071369 A1  Mar. 7, 2019

(30) Foreign Application Priority Data

Sep. 1, 2017 (TW) .............................. 106130046 A

(51) Int. Cl.
*C04B 41/83* (2006.01)
*B29C 45/14* (2006.01)
(Continued)

(52) U.S. Cl.
CPC ........ *C04B 41/83* (2013.01); *B29C 45/14311* (2013.01); *B32B 3/266* (2013.01);
(Continued)

(58) Field of Classification Search
None
See application file for complete search history.

(56) References Cited

U.S. PATENT DOCUMENTS 5,792,375 A * 8/1998 Farquhar .............. B23K 20/023
216/105
2007/0010411 A1 * 1/2007 Amemiya ........... C11D 11/0047
510/175

(Continued)

FOREIGN PATENT DOCUMENTS

CN 107010998 A 8/2017
JP 2011529404 A 12/2011

*Primary Examiner* — Shamim Ahmed
(74) *Attorney, Agent, or Firm* — Muncy, Geissler, Olds & Lowe, P.C.

(57) ABSTRACT

A ceramic and plastic composite and a method for fabricating the same are disclosed. A chemical cleaning treatment, a microetching treatment, a hole reaming treatment, and a surface activating treatment are performed on the surface of a ceramic matrix to form nanoholes with an average diameter ranging between 150 nm and 450 nm. Plastics are injected onto the surface of the baked ceramic matrix to form a plastic layer. The plastic layer more deeply fills the nanoholes to have higher adhesion. Thus, the higher combined strength and air tightness exist between the ceramic matrix and the plastic layer to improve the reliability and the using performance of the ceramic and plastic composite.

26 Claims, 5 Drawing Sheets

(51) Int. Cl.
  *B44C 1/22*    (2006.01)
  *B32B 3/26*    (2006.01)
  *C04B 41/00*   (2006.01)
  *C04B 41/53*   (2006.01)
  *C04B 38/04*   (2006.01)
  *C04B 41/48*   (2006.01)
  *C04B 38/00*   (2006.01)
  *B29K 709/02*  (2006.01)
  *B29K 67/00*   (2006.01)

(52) U.S. Cl.
  CPC .......... *C04B 38/0054* (2013.01); *C04B 38/04* (2013.01); *C04B 41/009* (2013.01); *C04B 41/4826* (2013.01); *C04B 41/4849* (2013.01); *C04B 41/4892* (2013.01); *C04B 41/4896* (2013.01); *C04B 41/5315* (2013.01); *B29C 2045/14803* (2013.01); *B29C 2045/14868* (2013.01); *B29K 2067/006* (2013.01); *B29K 2709/02* (2013.01)

(56) References Cited

U.S. PATENT DOCUMENTS

2015/0152124 A1* 6/2015 Mori ..................... A61K 31/53
                                                     428/457
2019/0351594 A1* 11/2019 Ren ......................... C04B 41/83

\* cited by examiner

CERAMIC AND PLASTIC COMPOSITE AND METHOD FOR FABRICATING THE SAME

This application claims priority for Taiwan patent application no. 106130046 filed on Sep. 1, 2017, the content of which is incorporated by reference in its entirety.

BACKGROUND OF THE INVENTION

Field of the Invention

The present invention relates to a ceramic and plastic composite and a method for fabricating the same, particularly to a ceramic and plastic composite and a method for fabricating the same, which uses nanoholes to enhance the combined strength of the composite.

Description of the Related Art

With the popularization of 3C electronic products, the aesthetic level of consumers endlessly increases. The products are asked to have high performance, low thickness, light weight, and elegant and aesthetic texture. Since structural components made of ceramic have natural beauty and soft touches, they have better durability and better air tightness and prevent an antenna from shielding compared with the conventional structural components made of metal and plastic. Thus, the structural components made of ceramics are being greeted with increasing approval and popularly applied to 3C electronic products.

However, ceramics are hard and brittle and unsuited for some structures. Thus, how to combine ceramics with plastic structures very well is a difficult problem that the existing technology faces. In general, a plastic member is fixed to the inner surface of the ceramic component through an adhesive. Nevertheless, the plastic member easily drops off from the ceramic component, which results in large difficulty for subsequent process. In addition, various engaging components, such as buckles or indents, are also used to stably combine the ceramic member with the plastic component, but this way will greatly increase the fabrication cost.

To overcome the abovementioned problems, the present invention provides a ceramic and plastic composite and a method for fabricating the same. The fabrication method is very simple. Besides, the present invention greatly improves the combined strength and the air tightness of the composite. The present invention differs from the conventional structure and the method for fabricating the same and solves the afore-mentioned problems of the prior art. The embodiments of the present invention are described as follows.

SUMMARY OF THE INVENTION

The primary objective of the present invention is to provide a ceramic and plastic composite and a method for fabricating the same, which etches the surface of a ceramic matrix to have nanoholes with an average diameter ranging between 150 nm and 450 nm. Plastics are injected onto the surface of the baked ceramic matrix to form a plastic layer. The plastic layer more deeply fills the nanoholes to have higher adhesion. Thus, the higher combined strength and air tightness exist between the ceramic matrix and the plastic layer to improve the reliability and the performance of the product.

Another objective of the present invention is to provide a ceramic and plastic composite and a method for fabricating the same, which has a simple fabrication process and a low fabrication cost, easily produces a lightweight product, and decreases the thickness of the product.

To achieve the abovementioned objectives, the present invention provides an method for fabricating a ceramic and plastic composite, which comprises: (a) performing a chemical cleaning treatment on a surface of a ceramic matrix; (b) performing an activation treatment on the surface of the ceramic matrix after the chemical cleaning treatment; (c) performing a microetching treatment on the surface of the ceramic matrix after the activation treatment, so as to form a plurality of microholes; (d) performing a hole reaming treatment on the surface of the ceramic matrix after the microetching treatment, so as to enlarge an average diameter of the plurality of microholes, thereby forming a plurality of nanoholes, and the average diameter of the plurality of nanoholes ranges between 150 nm and 450 nm; (e) performing a surface activating treatment on the surface of the ceramic matrix after the hole reaming treatment; (f) performing a baking process on the surface of the ceramic matrix after the surface activating treatment; and (g) injecting plastics onto the surface of the ceramic matrix after the baking process to form a plastic layer and combining the plastic layer with the surface of the ceramic matrix through the plurality of nanoholes, so as to form the ceramic and plastic composite.

Preferably, the average diameter of the plurality of nanoholes ranges between 200 nm and 400 nm.

Preferably, in operation (a), the chemical cleaning treatment comprises a wax losing treatment and a degreasing treatment.

Preferably, the ceramic matrix comprises $Si_3N_4$, WC, $ZrO_2$, or $Al_2O_3$. Preferably, the plastic layer comprises polyamide (PA), polyphenylene sulfide (PPS), poly-(Butylene Terephthalate) (PBT), or polyetherketoneketone (PEAK).

Preferably, in operation (b), the activation treatment is performed by an activator, and the activator further comprises a surfactant of 8-10 percentage weight (wt %), an organic base of 5-8 wt %, a complexing agent of 2-5 wt %, an additive of 2-5 wt %, and water of remaining wt %.

Preferably, in operation (c), the microetching treatment is performed by a microetching processing agent, and the microetching processing agent further comprises acid salt of 50 wt %, a corrosion inhibitor of 1-5 wt %, a surfactant of 1-3 wt %, an additive of 1-3 wt %, and water of remaining wt %.

Preferably, in operation (d), the hole reaming treatment is performed by a hole reaming processing agent, and the hole reaming processing agent further comprises a penetrant of 5-10 wt %, organic acid salt of 35 wt %, a surfactant of 1-3 wt %, an additive of 1-3 wt %, and water of remaining wt %.

Preferably, in operation (e), the surface activating treatment is performed by a surface activating agent, and the surface activating agent comprises an organic acid of 1-10 wt %, a corrosion inhibitor of 1-5 wt %, a surfactant of 1-3 wt %, an additive of 1-3 wt %, and water of remaining wt %.

The present invention also provides a ceramic and plastic composite, which comprises a ceramic matrix and a plastic layer formed by injecting plastics onto a surface of the ceramic matrix. A plurality of nanoholes are distributed on the surface of the ceramic matrix, an average diameter of the plurality of nanoholes ranges between 150 nm and 450 nm, the plastic layer is embedded into the plurality of nanoholes, and the force of combining the plastic layer with the ceramic matrix reaches 300 kg/cm$^2$.

Preferably, the average diameter of the plurality of nanoholes ranges between 200 nm and 400 nm.

Preferably, the ceramic matrix comprises $Si_3N_4$, WC, $ZrO_2$, or $Al_2O_3$.

Preferably, the plastic layer comprises polyamide (PA), polyphenylene sulfide (PPS), poly-(Butylene Terephthalate) (PBT), or polyetherketoneketone (PEAK).

Compared with the conventional technology, the present invention performs a chemical cleaning treatment, a microetching treatment, a hole reaming treatment, and a surface activating treatment on the surface of a ceramic matrix to form nanoholes with an average diameter ranging between 150 nm and 450 nm. Plastics are injected onto the surface of the baked ceramic matrix to form a plastic layer. The plastic layer more completely fills the nanoholes to have higher adhesion. Thus, the strength of combining the ceramic matrix with the plastic layer is greatly improved, and the air tightness between the ceramic matrix and the plastic layer can be guaranteed.

Below, the embodiments are described in detail in cooperation with the drawings to make easily understood the technical contents, characteristics and accomplishments of the present invention.

DETAILED DESCRIPTION OF THE INVENTION

Figure 1:
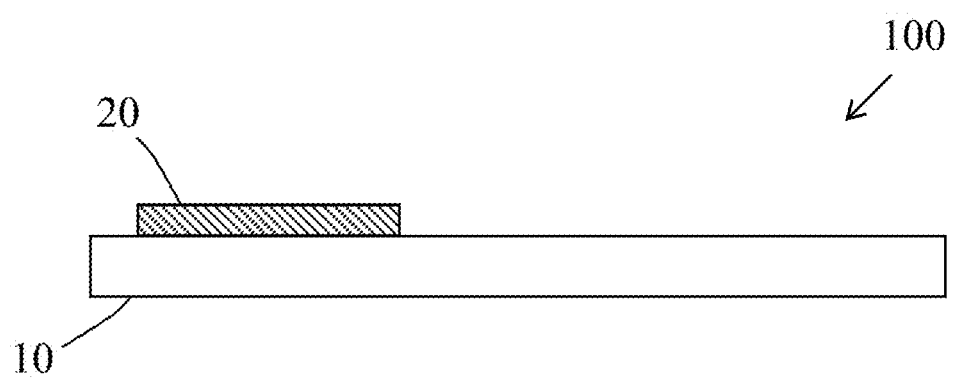
FIG. 1 is a cross-sectional view of a ceramic and plastic composite according to an embodiment of the present invention.

Refer to FIG. 1. FIG. 1 is a cross-sectional view of a ceramic and plastic composite according to an embodiment of the present invention. The ceramic and plastic composite 100 comprises a ceramic matrix 10 and a plastic layer 20 formed on the surface of the ceramic matrix 10. For example, the ceramic matrix 10 comprises $Si_3N_4$, WC, $ZrO_2$, or $Al_2O_3$, and the plastic layer 20 comprises polyamide (PA), polyphenylene sulfide (PPS), poly-(Butylene Terephthalate) (PBT), or polyetherketoneketone (PEAK).

Figure 2A:
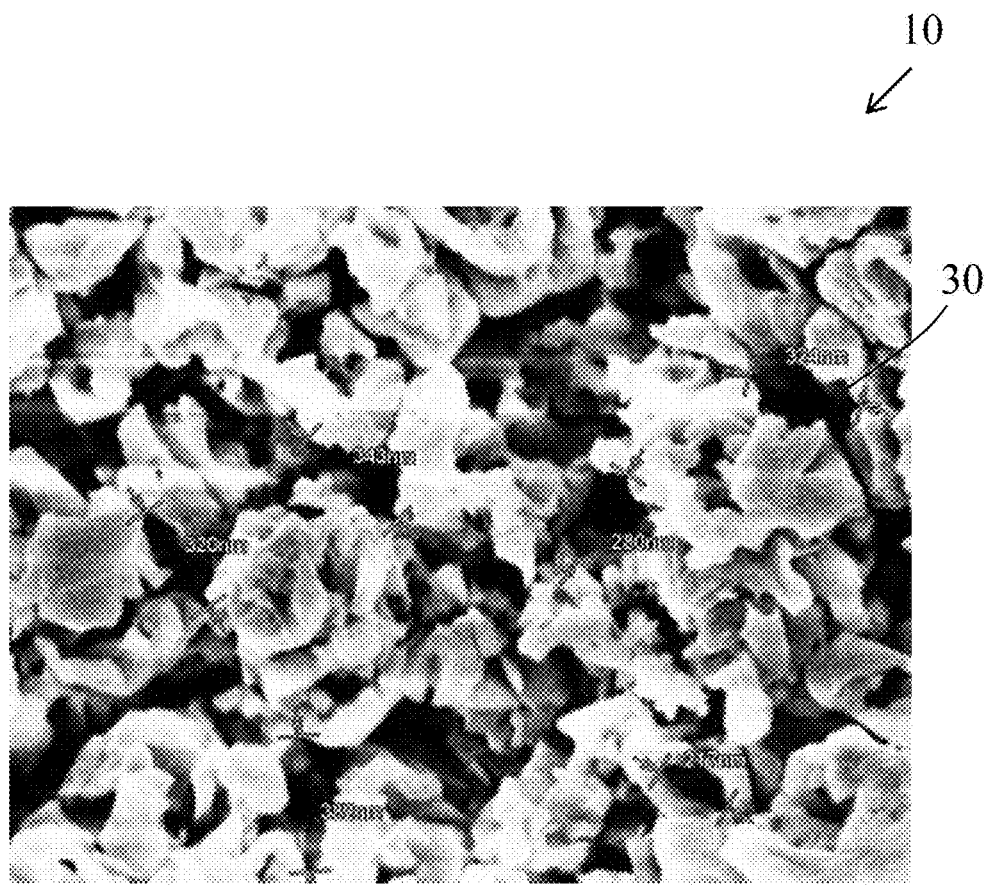
FIG. 2A and FIG. 2B are scanning electron microscope (SEM) views of nanoholes of the surface of a ceramic matrix according to an embodiment of the present invention.
Figure 2B:
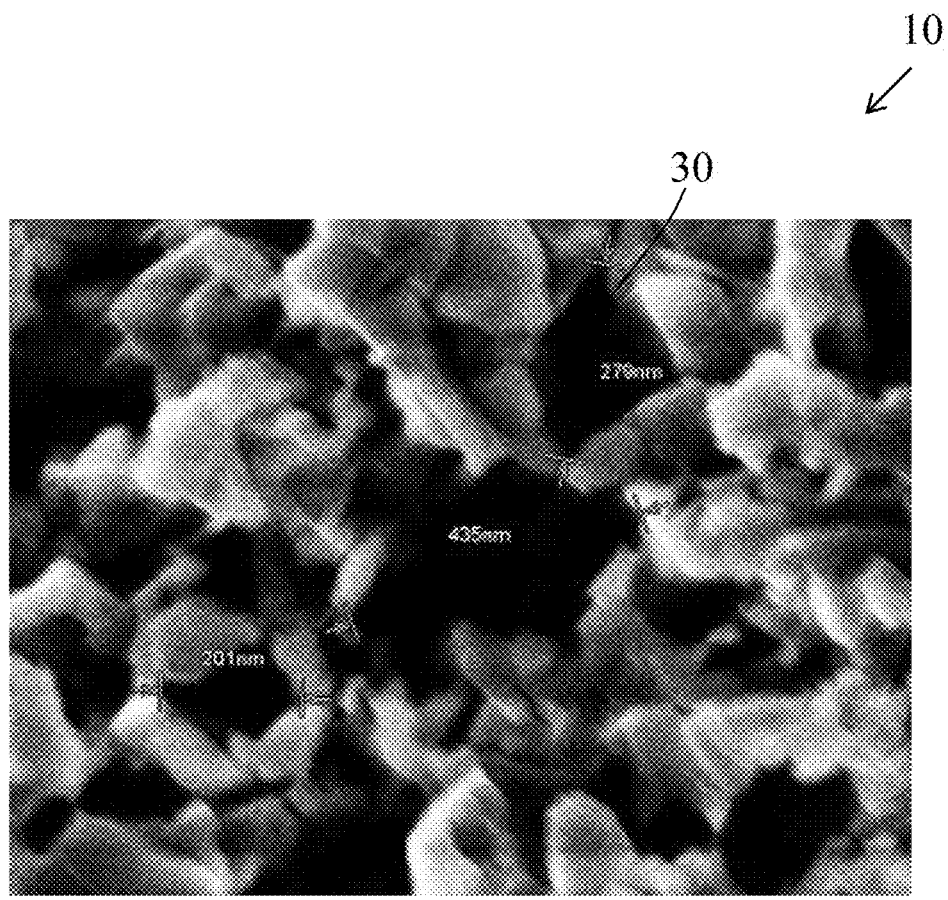

Refer to FIG. 2A and FIG. 2B. FIG. 2A and FIG. 2B are scanning electron microscope (SEM) views of nanoholes 30 of the surface of the ceramic matrix 10 according to an embodiment of the present invention. It can be seen that a plurality of nanoholes 30 are distributed on the surface of the ceramic matrix 10. The diameter of each of the plurality of nanoholes 30 ranges between 200 nm and 400 nm, such that the plastic layer that is then injection molded completely fills the nanoholes 30. In the present invention, the average diameter of the plurality of nanoholes 30 ranges between 150 nm and 450 nm, preferably 200-400 nm. Thus, the force that the plastic layer 20 adheres to the nanoholes 30 can increase, thereby improving the combined strength and the air tightness between the ceramic matrix 10 and the plastic layer 20. The combined force of the ceramic and plastic composite 100 reaches 300 kg/cm$^2$ under a practical test for combined strength.

Figure 3:
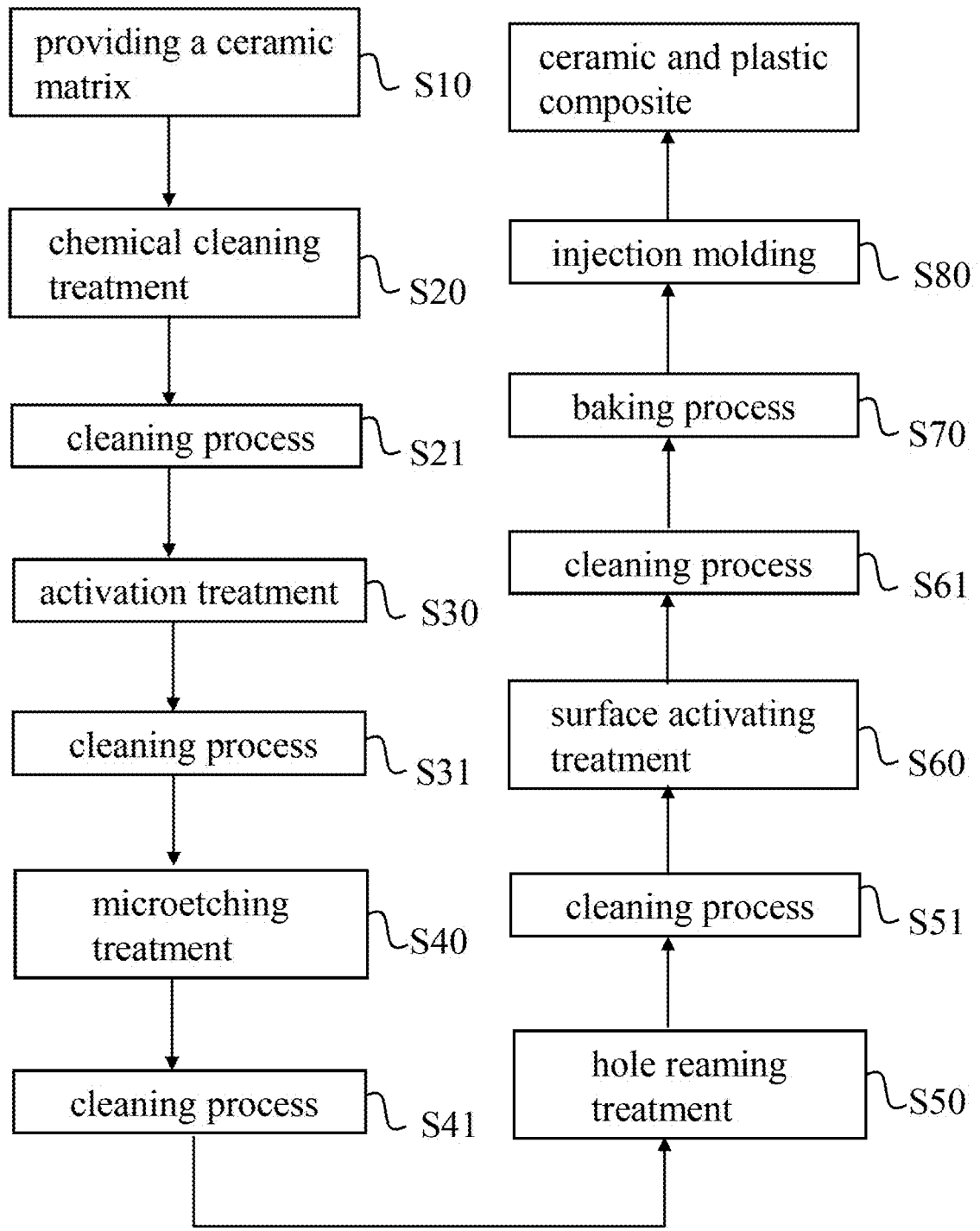
FIG. 3 is a flowchart of a method for fabricating a ceramic and plastic composite according to an embodiment of the present invention.

Refer to FIG. 3. FIG. 3 is a flowchart of a method for fabricating a ceramic and plastic composite according to an embodiment of the present invention. The flowchart is described as follows.

Firstly, in Step S10, ceramic powders are pulped and cast into slices, the slices are pressed, molded, and sintered to form ceramics, and the ceramics are mechanically processed, shaped, and polished to form a ceramic matrix.

In Step S20, a chemical cleaning treatment is performed on the surface of the ceramic matrix, wherein a solvent is used to perform a wax losing treatment, and then a degreasing treatment is performed to remove impurities and grease on the surface of the ceramic matrix.

In Step S21, in order to further remove filth on the surface of the ceramic matrix, a cleaning process is performed on the surface of the ceramic matrix one time or several times.

In Step S30, an activation treatment is performed on the surface of the ceramic matrix to form a surface of the ceramic matrix with catalytic properties, which favors the subsequent chemical reactions. The activation treatment is performed by an activator, and the activator further comprises a surfactant of 8-10 percentage weight (wt %), an organic base of 5-8 wt %, a complexing agent of 2-5 wt %, an additive of 2-5 wt %, and water of remaining wt %. The activation treatment is performed at a temperature of 45-55° C. for 5-8 min.

In Step S31, a cleaning process is also performed on the surface of the ceramic matrix one time or several times after the activation treatment.

In Step S40, a microetching processing agent is used to perform a microetching treatment on the surface of the ceramic matrix after the activation treatment, so as to form a plurality of microholes with an average diameter of 20-40 nm. The microetching processing agent further comprises acid salt of 50 wt %, a corrosion inhibitor of 1-5 wt %, a surfactant of 1-3 wt %, an additive of 1-3 wt %, and water of remaining wt %. The microetching treatment is performed at a temperature of 65-85° C. for 30 min.

In Step S41, a cleaning process is also performed on the surface of the ceramic matrix having the microholes one time or several times.

In Step S50, a hole reaming processing agent is used to perform a hole reaming treatment on the surface of the ceramic matrix after the microetching treatment, so as to enlarge an average diameter of the plurality of microholes, thereby forming a plurality of nanoholes, and the average diameter of the plurality of nanoholes ranges between 150 nm and 450 nm, preferably 200-400 nm. In the embodiment, the hole reaming processing agent further comprises a penetrant of 5-10 wt %, organic acid salt of 35 wt %, a surfactant of 1-3 wt %, an additive of 1-3 wt %, and water of remaining wt %. The hole reaming treatment is performed at a temperature of 65-85° C. for 35 min.

In Step S60, a surface activating agent is used to perform a surface activating treatment on the surface of the ceramic matrix after the hole reaming treatment, such that the surface of the ceramic matrix having the nanoholes changes its microstate. The surface activating agent comprises an organic acid of 1-10 wt %, a corrosion inhibitor of 1-5 wt %, a surfactant of 1-3 wt %, an additive of 1-3 wt %, and water of remaining wt %. The surface activating treatment is performed at a temperature of 55-65° C. for 3-5 min.

In Step S61, a cleaning process is also performed on the surface of the ceramic matrix one time or several times after the surface activating treatment.

Afterwards, the process proceeds to Step S70. In Step S70, a baking process is performed on the surface of the ceramic matrix after the surface activating treatment.

Figure 4:
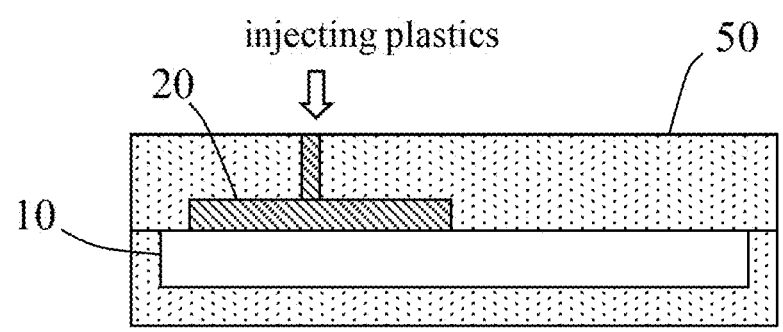
FIG. 4 is a diagram showing plastics injected onto the surface of a ceramic matrix according to an embodiment of the present invention.

Finally, the process proceeds to Step S80. As shown in FIG. 4, the ceramic matrix 10 that has been already baked is placed in an injection mold 50, and plastics are injected onto the surface of the ceramic matrix 10 having the nanoholes, so as to fill each of the nanoholes. After the plastics are molded, a plastic layer 20 is formed. The plastic layer 20 is tightly combined with the surface of the ceramic matrix 10 through the nanoholes, so as to fabricate the ceramic and plastic composite of the present invention.

In Step S80, the molding temperature is about 140° C., the barrel temperature at the first stage, the second stage, the third stage, and the fourth stage are respectively 290° C., 295° C., 300° C., and 305° C., and the injection pressure is 1750 kgf/cm$^2$.

It is observed that the combined strength of the ceramic and plastic composite of the present invention reaches 300 kg/cm$^2$ under a tensile strength test. The tensile strength test is performed by an electronic universal material testing machine. The testing speed and the testing standard of the electronic universal material testing machine are respectively 10.00 mm/min and 120/0.5 kgf/cm$^2$. A testing specimen is made of a ceramic and plastic composite whose ceramic matrix is $ZrO_2$. The plastic layer of the ceramic and plastic composite is made of poly-(Butylene Terephthalate) (PBT). The area of combining the plastic layer with the ceramic matrix is 0.5 cm$^2$. The specimen has a size of 45×18×1.5 mm.

In conclusion, the effect of combining the ceramic matrix and the plastic layer of the ceramic and plastic composite are quite stable. Besides, the ceramic and plastic composite has a high combined strength. As a result, compared with the conventional technology, the ceramic and plastic composite and the method for fabricating the same of the present invention perform the chemical cleaning treatment, the microetching treatment, the hole reaming treatment, and the surface activating treatment to form the nanoholes having an average diameter of 150-450 nm. Thus, the injection molded plastic layer more completely cover each of the nanoholes to have higher adhesion, thereby effectively improving the combined strength of the ceramic matrix and the plastic layer, guaranteeing the air tightness between the ceramic matrix and the plastic layer, and further stabilizing the quality and performance of the product. In addition, the present invention has a simple fabrication process and a low cost, easily produces lightweight products, decreases thickness, satisfies the market requirement for precise electronic products, and improves the industrial competitiveness of products.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for fabricating a ceramic and plastic composite comprising:
   (a) performing a chemical cleaning treatment on a surface of a ceramic matrix;
   (b) performing an activation treatment on the surface of the ceramic matrix after the chemical cleaning treatment;
   (c) performing a microetching treatment on the surface of the ceramic matrix after the activation treatment, so as to form a plurality of microholes;
   (d) performing a hole reaming treatment on the surface of the ceramic matrix after the microetching treatment, so as to enlarge an average diameter of the plurality of microholes, thereby forming a plurality of nanoholes, and the average diameter of the plurality of nanoholes ranges between 150 nm and 450 nm;
   (e) performing a surface activating treatment on the surface of the ceramic matrix after the hole reaming treatment;
   (f) performing a baking process on the surface of the ceramic matrix after the surface activating treatment; and
   (g) injecting plastics onto the surface of the ceramic matrix after the baking process to form a plastic layer and combining the plastic layer with the surface of the ceramic matrix through the plurality of nanoholes, so as to form the ceramic and plastic composite,
   wherein in operation (b), the activation treatment is performed by an activator, and the activator comprises a surfactant of 8-10 percentage weight (wt %), an organic base of 5-8 wt %, a complexing agent of 2-5 wt %, an additive of 2-5 wt %, and water of remaining wt %.

2. The method for fabricating the ceramic and plastic composite according to claim 1, wherein the average diameter of the plurality of nanoholes ranges between 200 nm and 400 nm.

3. The method for fabricating the ceramic and plastic composite according to claim 1, wherein in operation (a), the chemical cleaning treatment comprises a wax losing treatment and a degreasing treatment.

4. The method for fabricating the ceramic and plastic composite according to claim 1, wherein the ceramic matrix comprises $Si_3N_4$, WC, $ZrO_2$, or $Al_2O_3$.

5. The method for fabricating the ceramic and plastic composite according to claim 1, wherein the plastic layer comprises polyamide (PA), polyphenylene sulfide (PPS), poly-(Butylene Terephthalate) (PBT), or polyetherketoneketone (PEAK).

6. The method for fabricating the ceramic and plastic composite according to claim 1, wherein in operation (c), the microetching treatment is performed by a microetching processing agent, and the microetching processing agent comprises acid salt of 50 wt %, a corrosion inhibitor of 1-5 wt %, a surfactant of 1-3 wt %, an additive of 1-3 wt %, and water of remaining wt %.

7. The method for fabricating the ceramic and plastic composite according to claim 1, wherein in operation (d), the hole reaming treatment is performed by a hole reaming processing agent, and the hole reaming processing agent comprises a penetrant of 5-10 wt %, organic acid salt of 35 wt %, a surfactant of 1-3 wt %, an additive of 1-3 wt %, and water of remaining wt %.

8. The method for fabricating the ceramic and plastic composite according to claim 1, wherein in operation (e), the surface activating treatment is performed by a surface activating agent, and the surface activating agent comprises an organic acid of 1-10 wt %, a corrosion inhibitor of 1-5 wt %, a surfactant of 1-3 wt %, an additive of 1-3 wt %, and water of remaining wt %.

9. A method for fabricating a ceramic and plastic composite comprising:

(a) performing a chemical cleaning treatment on a surface of a ceramic matrix;
(b) performing an activation treatment on the surface of the ceramic matrix after the chemical cleaning treatment;
(c) performing a microetching treatment on the surface of the ceramic matrix after the activation treatment, so as to form a plurality of microholes;
(d) performing a hole reaming treatment on the surface of the ceramic matrix after the microetching treatment, so as to enlarge an average diameter of the plurality of microholes, thereby forming a plurality of nanoholes, and the average diameter of the plurality of nanoholes ranges between 150 nm and 450 nm;
(e) performing a surface activating treatment on the surface of the ceramic matrix after the hole reaming treatment;
(f) performing a baking process on the surface of the ceramic matrix after the surface activating treatment; and
(g) injecting plastics onto the surface of the ceramic matrix after the baking process to form a plastic layer and combining the plastic layer with the surface of the ceramic matrix through the plurality of nanoholes, so as to form the ceramic and plastic composite;
wherein in operation (c), the microetching treatment is performed by a microetching processing agent, and the microetching processing agent comprises acid salt of 50 wt %, a corrosion inhibitor of 1-5 wt %, a surfactant of 1-3 wt %, an additive of 1-3 wt %, and water of remaining wt %.

10. The method for fabricating the ceramic and plastic composite according to claim 9, wherein the average diameter of the plurality of nanoholes ranges between 200 nm and 400 nm.

11. The method for fabricating the ceramic and plastic composite according to claim 9, wherein in operation (a), the chemical cleaning treatment comprises a wax losing treatment and a degreasing treatment.

12. The method for fabricating the ceramic and plastic composite according to claim 9, wherein the ceramic matrix comprises $Si_3N_4$, WC, $ZrO_2$, or $Al_2O_3$.

13. The method for fabricating the ceramic and plastic composite according to claim 9, wherein the plastic layer comprises polyamide (PA), polyphenylene sulfide (PPS), poly-(Butylene Terephthalate) (PBT), or polyetherketoneketone (PEAK).

14. The method for fabricating the ceramic and plastic composite according to claim 9, wherein in operation (d), the hole reaming treatment is performed by a hole reaming processing agent, and the hole reaming processing agent comprises a penetrant of 5-10 wt %, organic acid salt of 35 wt %, a surfactant of 1-3 wt %, an additive of 1-3 wt %, and water of remaining wt %.

15. The method for fabricating the ceramic and plastic composite according to claim 9, wherein in operation (e), the surface activating treatment is performed by a surface activating agent, and the surface activating agent comprises an organic acid of 1-10 wt %, a corrosion inhibitor of 1-5 wt %, a surfactant of 1-3 wt %, an additive of 1-3 wt %, and water of remaining wt %.

16. A method for fabricating a ceramic and plastic composite comprising:
(a) performing a chemical cleaning treatment on a surface of a ceramic matrix;
(b) performing an activation treatment on the surface of the ceramic matrix after the chemical cleaning treatment;
(c) performing a microetching treatment on the surface of the ceramic matrix after the activation treatment, so as to form a plurality of microholes;
(d) performing a hole reaming treatment on the surface of the ceramic matrix after the microetching treatment, so as to enlarge an average diameter of the plurality of microholes, thereby forming a plurality of nanoholes, and the average diameter of the plurality of nanoholes ranges between 150 nm and 450 nm;
(e) performing a surface activating treatment on the surface of the ceramic matrix after the hole reaming treatment;
(f) performing a baking process on the surface of the ceramic matrix after the surface activating treatment; and
(g) injecting plastics onto the surface of the ceramic matrix after the baking process to form a plastic layer and combining the plastic layer with the surface of the ceramic matrix through the plurality of nanoholes, so as to form the ceramic and plastic composite;
wherein in operation (d), the hole reaming treatment is performed by a hole reaming processing agent, and the hole reaming processing agent comprises a penetrant of 5-10 wt %, organic acid salt of 35 wt %, a surfactant of 1-3 wt %, an additive of 1-3 wt %, and water of remaining wt %.

17. The method for fabricating the ceramic and plastic composite according to claim 16, wherein the average diameter of the plurality of nanoholes ranges between 200 nm and 400 nm.

18. The method for fabricating the ceramic and plastic composite according to claim 16, wherein in operation (a), the chemical cleaning treatment comprises a wax losing treatment and a degreasing treatment.

19. The method for fabricating the ceramic and plastic composite according to claim 16, wherein the ceramic matrix comprises $Si_3N_4$, WC, $ZrO_2$, or $Al_2O_3$.

20. The method for fabricating the ceramic and plastic composite according to claim 16, wherein the plastic layer comprises polyamide (PA), polyphenylene sulfide (PPS), poly-(Butylene Terephthalate) (PBT), or polyetherketoneketone (PEAK).

21. The method for fabricating the ceramic and plastic composite according to claim 16, wherein in operation (e), the surface activating treatment is performed by a surface activating agent, and the surface activating agent comprises an organic acid of 1-10 wt %, a corrosion inhibitor of 1-5 wt %, a surfactant of 1-3 wt %, an additive of 1-3 wt %, and water of remaining wt %.

22. A method for fabricating a ceramic and plastic composite comprising:
(a) performing a chemical cleaning treatment on a surface of a ceramic matrix;
(b) performing an activation treatment on the surface of the ceramic matrix after the chemical cleaning treatment;
(c) performing a microetching treatment on the surface of the ceramic matrix after the activation treatment, so as to form a plurality of microholes;
(d) performing a hole reaming treatment on the surface of the ceramic matrix after the microetching treatment, so as to enlarge an average diameter of the plurality of microholes, thereby forming a plurality of nanoholes, and the average diameter of the plurality of nanoholes ranges between 150 nm and 450 nm;
(e) performing a surface activating treatment on the surface of the ceramic matrix after the hole reaming treatment;
(f) performing a baking process on the surface of the ceramic matrix after the surface activating treatment; and
(g) injecting plastics onto the surface of the ceramic matrix after the baking process to form a plastic layer and combining the plastic layer with the surface of the ceramic matrix through the plurality of nanoholes, so as to form the ceramic and plastic composite;
wherein in operation (e), the surface activating treatment is performed by a surface activating agent, and the surface activating agent comprises an organic acid of 1-10 wt %, a corrosion inhibitor of 1-5 wt %, a surfactant of 1-3 wt %, an additive of 1-3 wt %, and water of remaining wt %.

23. The method for fabricating the ceramic and plastic composite according to claim 22, wherein the average diameter of the plurality of nanoholes ranges between 200 nm and 400 nm.

24. The method for fabricating the ceramic and plastic composite according to claim 22, wherein in operation (a), the chemical cleaning treatment comprises a wax losing treatment and a degreasing treatment.

25. The method for fabricating the ceramic and plastic composite according to claim 22, wherein the ceramic matrix comprises $Si_3N_4$, WC, $ZrO_2$, or $Al_2O_3$.

26. The method for fabricating the ceramic and plastic composite according to claim 22, wherein the plastic layer comprises polyamide (PA), polyphenylene sulfide (PPS), poly-(Butylene Terephthalate) (PBT), or polyetherketoneketone (PEAK).

* * * * *